(12) United States Patent
Zheng et al.

(10) Patent No.: US 10,034,429 B2
(45) Date of Patent: Jul. 31, 2018

(54) EMBEDDED-OUTER ROTOR MOTOR DIRECT DRIVEN MOWER DRIVING WHEEL AND MOWER

(71) Applicant: ZHEJIANG YAT ELECTRICAL APPLIANCE CO., LTD, Zhejiang (CN)

(72) Inventors: Yaping Zheng, Zhejiang (CN); Daoyan Li, Zhejiang (CN); Zhiqiang He, Zhejiang (CN)

(73) Assignee: ZHEJIANG YAT ELECTRICAL APPLIANCE CO., LTD, Zhejiang (CN)

( * ) Notice: Subject to any disclaimer, the term of this patent is extended or adjusted under 35 U.S.C. 154(b) by 0 days.

(21) Appl. No.: 15/316,518

(22) PCT Filed: Jul. 23, 2014

(86) PCT No.: PCT/CN2014/082805
§ 371 (c)(1),
(2) Date: Dec. 6, 2016

(87) PCT Pub. No.: WO2015/184673
PCT Pub. Date: Dec. 10, 2015

(65) Prior Publication Data
US 2017/0156265 A1     Jun. 8, 2017

(30) Foreign Application Priority Data
Jun. 6, 2014 (CN) .......................... 2014 1 0250285

(51) Int. Cl.
*A01D 69/02* (2006.01)
*A01D 34/82* (2006.01)
(Continued)

(52) U.S. Cl.
CPC ............. *A01D 69/02* (2013.01); *A01D 34/82* (2013.01); *B60K 7/0007* (2013.01);
(Continued)

(58) Field of Classification Search
CPC .................... B60K 7/00; B60K 7/0007; B60K 2007/0038; B60K 8/00
(Continued)

(56) References Cited

U.S. PATENT DOCUMENTS

| 4,446,681 A | 5/1984 | Dynie et al. |
| 6,002,192 A | 12/1999 | Krivospitski et al. |

(Continued)

FOREIGN PATENT DOCUMENTS

| CN | 2341317 | 9/1999 |
| CN | 1581646 | 2/2005 |

(Continued)

OTHER PUBLICATIONS

"International Search Report (Form PCT/ISA/210) of PCT/CN2014/082805", dated Dec. 29, 2014, with English translation thereof, pp. 1-4.
(Continued)

*Primary Examiner* — John D Walters
*Assistant Examiner* — James J Triggs
(74) *Attorney, Agent, or Firm* — JCIPRNET

(57) ABSTRACT

The present invention provides an embedded-outer rotor motor direct driven mower driving wheel and a mower. The embedded-outer rotor motor direct driven mower driving wheel comprises a driving wheel main body formed by the assembling of a wheel side cover I, a wheel side cover II, and a wheel body sandwiched between the wheel side cover I and the wheel side cover II, the wheel side cover I, the wheel side cover II and the wheel body are enclosed to define a cavity, an outer rotor motor is mounted in the cavity, an outer (Continued)

rotor portion of the outer rotor motor is fixedly arranged relative to the driving wheel main body, an internal stator portion of the outer rotor motor is provided with a fixed shaft penetrating through the wheel side cover I and extending out of the driving wheel main body, and the wheel side cover I is provided with a shaft hole I allowing the fixed shaft to penetrate through. The present invention arranges the outer rotor motor inside the driving wheel and directly drives the mower driving wheel through the outer rotor motor, thus, transmission precision and reliability are good, and the inner space of the mower is more reasonable.

14 Claims, 3 Drawing Sheets

(51) Int. Cl.
  *B60K 7/00* (2006.01)
  *A01D 101/00* (2006.01)
(52) U.S. Cl.
  CPC .. *A01D 2101/00* (2013.01); *B60K 2007/0038* (2013.01); *B60K 2007/0092* (2013.01)
(58) Field of Classification Search
  USPC .................................................................. 7/7
  See application file for complete search history.

(56) References Cited

U.S. PATENT DOCUMENTS

| | | | | |
|---|---|---|---|---|
| 8,459,398 B2* | 6/2013 | Iwaki | ................... | B60K 7/0015 |
| | | | | 180/308 |
| 8,888,130 B2* | 11/2014 | Stark | ...................... | A01D 34/66 |
| | | | | 280/771 |
| 2008/0277188 A1* | 11/2008 | Hauser | ..................... | B62D 3/02 |
| | | | | 180/422 |

FOREIGN PATENT DOCUMENTS

| | | |
|---|---|---|
| CN | 201248261 | 6/2009 |
| CN | 102007676 | 4/2011 |
| CN | 201821182 | 5/2011 |
| CN | 103650754 | 3/2014 |
| CN | 204046343 | 12/2014 |
| EP | 0637539 | 2/1995 |
| GB | 2369503 | 5/2002 |
| JP | H06144021 | 5/1994 |

OTHER PUBLICATIONS

"Office Action of China Priority Application No. 201410250285.4," dated Jan. 12, 2016, p. 1-p. 7.
"Notice of Allowance of China Priority Application No. 201410250285.4," dated Mar. 1, 2016, p. 1.

* cited by examiner

EMBEDDED-OUTER ROTOR MOTOR DIRECT DRIVEN MOWER DRIVING WHEEL AND MOWER

CROSS-REFERENCE TO RELATED APPLICATION

This application is a 371 application of an International PCT application serial no. PCT/CN2014/082805, filed on Jul. 23, 2014, which claims the priority benefits of China Application No. 201410250285.4, filed on Jun. 6, 2014. The entirety of each of the above-mentioned patent applications is hereby incorporated by reference herein and made a part of this specification.

TECHNICAL FIELD

The present invention relates to a driving wheel structure used for a lawn mower, particularly for an automatic self-guided or self-supporting lawn mower, and in particular relates to an embedded-outer rotor motor direct driven mower driving wheel and a mower.

BACKGROUND

With the rapid development of robot technologies, new requirements are put forward for the performance such as transmission precision, reliability and maintenance-free of transmission units and transmission systems thereof. Existing mowers generally have a wheel and a drive motor for driving the wheel to rotate, and an output end of the drive motor is connected with a rotating shaft of the wheel to drive the wheel to rotate; however, mowers of this structure have defects as follows: 1. The drive motor is located outside the wheel, and a position needs to be designed on the mower to mount the drive motor, thus the structure is relatively complex. 2. The drive motor occupying certain space impacts the setting of other mechanisms on the mower and thus reduces the transmission precision and reliability. 3. Common inner rotor motors have high rotation speed but relatively low movement inertia.

SUMMARY

The technical problem to be solved by the present invention lies in providing an embedded-outer rotor motor direct driven mower driving wheel and a mower, which arrange the outer rotor motor inside the driving wheel and directly drive the mower driving wheel through the outer rotor motor, so that transmission precision and reliability are good, the inner space of the mower is more reasonable and the walking stability of the driving wheel is improved.

In order to solve the above existing technical problem, the present invention adopts a following technical scheme that: an embedded-outer rotor motor direct driven mower driving wheel comprises a driving wheel main body formed by the assembling of a wheel side cover I, a wheel side cover II, and a wheel body sandwiched between the wheel side cover I and the wheel side cover II, the wheel side cover I, the wheel side cover II and the wheel body are enclosed to define a cavity, an outer rotor motor is mounted in the cavity, an outer rotor portion of the outer rotor motor is fixedly arranged relative to the driving wheel main body, a stator portion of the outer rotor motor is provided with a fixed member penetrating through the wheel side cover I and extending out of the driving wheel main body, and the wheel side cover I is provided with a shaft hole I allowing the fixed member to penetrate through.

Preferably, the outer edges of both the wheel side cover I and the wheel side cover II are provided with a plurality of convex tooth, and the convex tooth on the wheel side cover I and the convex tooth on the wheel side cover II are distributed in a staggered manner.

Preferably, the outer circumferential surface of the wheel body is provided with a plurality of concave arc surfaces, a protrusion I is formed at where adjacent concave arc surfaces are connected, the convex teeth on the wheel side cover II is arranged corresponding to the protrusion I on the wheel body, and the outer edge of the wheel side cover I located between two adjacent convex tooth is provided with a protrusion II arranged corresponding to the protrusion I on the wheel body.

Preferably, the outer circumferential surface of the wheel body is provided with a plurality of concave arc surfaces, and a protrusion I is formed at where adjacent concave arc surfaces are connected.

Preferably, the wheel body comprises an outer ring, an inner ring concentric with the outer ring, and a plurality of connection ribs connected between the outer ring and the inner ring, and the cavity is enclosed by the inner ring and two wheel side covers.

Preferably, the side wall of the wheel side cover I is provided with a ring body extending into the inner ring, and the outer diameter of the ring body is slightly less than the inner diameter of the inner ring such that the ring body is in clearance fit with the inner ring.

Preferably, the side wall of the wheel side cover I is provided with a plurality of reinforcing ribs extending along the radial direction of the wheel side cover I.

Preferably, the wheel side cover II and the wheel body are of a one-piece structure formed in an integrative molding way.

Preferably, the outer rotor portion of the outer rotor motor is connected with the wheel side cover II through a bolt, the wheel side cover II is provided with a plurality of threaded holes allowing the bolt to pass through, and the outer side of the wheel side cover II is mounted with a dust cap for covering the threaded hole.

Meanwhile, the present invention provides a mower, comprising a machine body and a driving wheel mounted on the machine body, the driving wheel being the embedded-outer rotor motor direct driven mower driving wheel described above.

The present invention has benefits as follows:

by adopting the embedded-outer rotor motor direct driven mower driving wheel and the mower provided by the above technical scheme, the present invention arranges the outer rotor motor inside the driving wheel and directly drives the mower driving wheel through the outer rotor motor, so that transmission precision and reliability are good, movement inertia is high, the walking stability of the driving wheel is improved and the inner space of the mower is more reasonable; moreover, the driving wheel has a firm overall structure and is difficult to damage.

DETAILED DESCRIPTION

Embodiment 1

Figure 1:
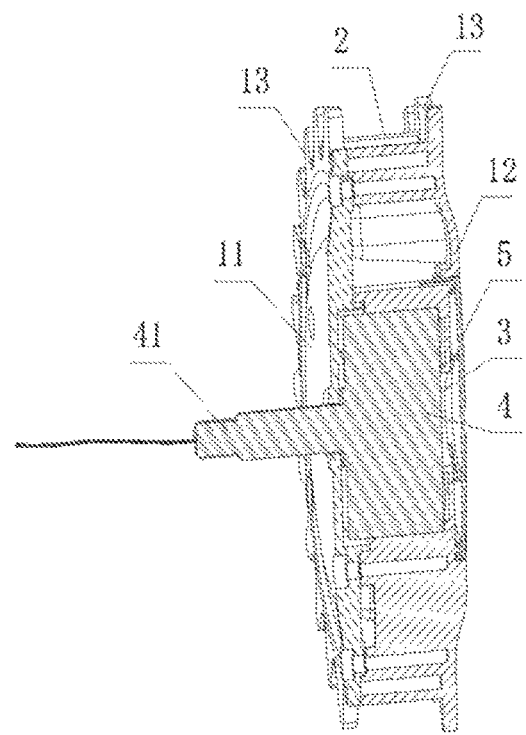
FIG. 1 is a sectional view of an Embodiment 1 of the present invention.
Figure 2:
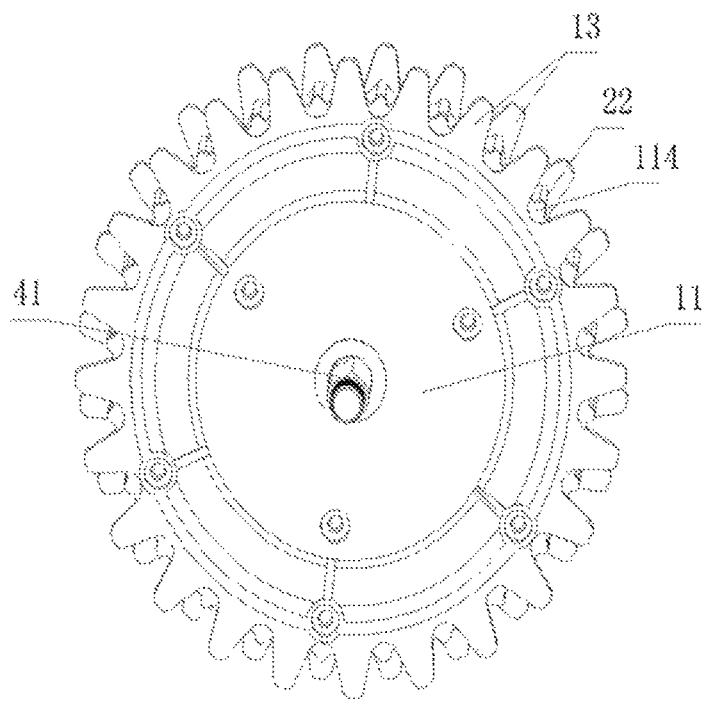
FIG. 2 is a structure diagram of the Embodiment 1 of the present invention.
Figure 3:
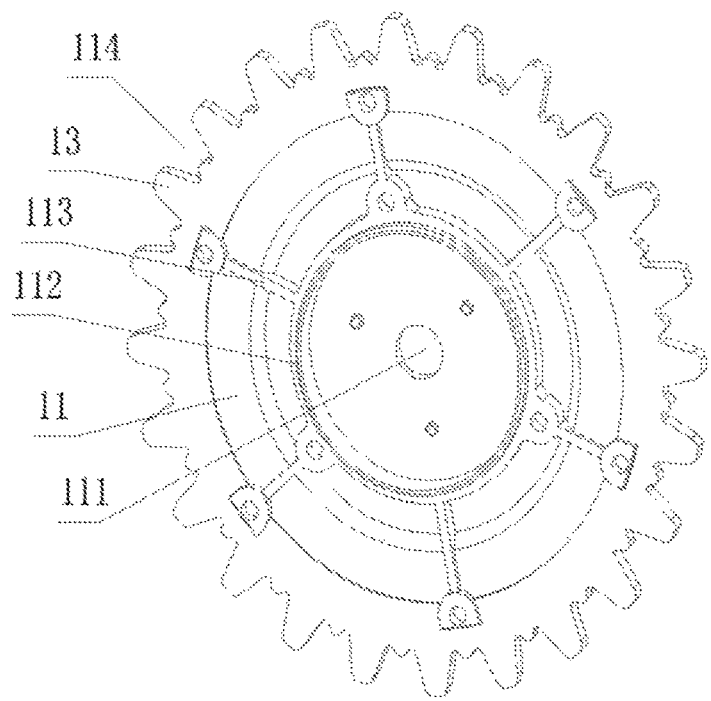
FIG. 3 is a structure diagram of a wheel side cover I in the Embodiment 1 of the present invention.
Figure 4:
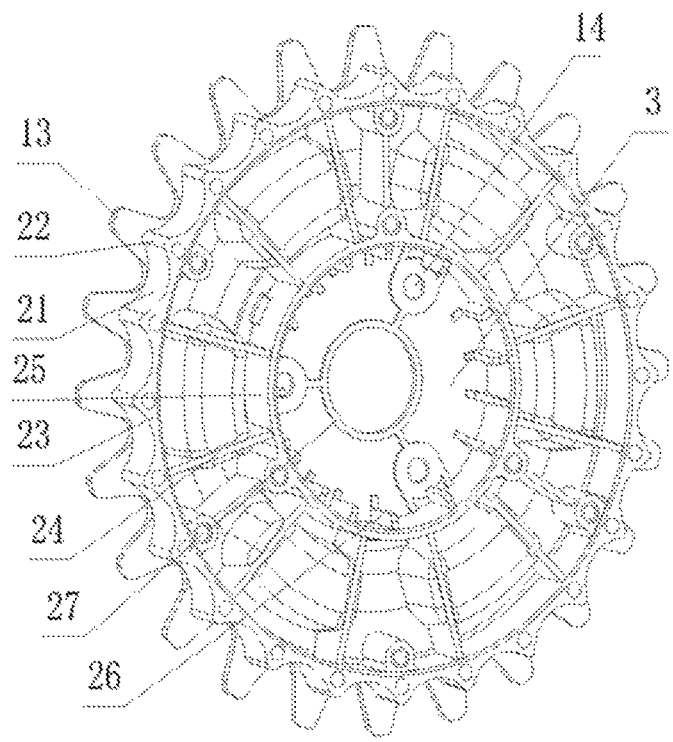
FIG. 4 is a structure diagram of a wheel side cover II in the Embodiment 1 of the present invention.
Figure 5:
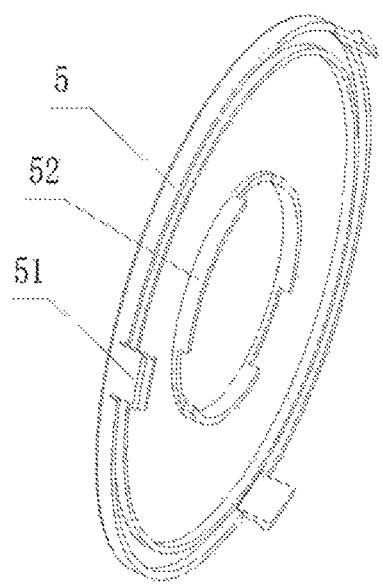
FIG. 5 is a structure diagram of a dust cap in the Embodiment 1 of the present invention.

As shown in FIG. 1 to FIG. 5, an embedded-outer rotor motor direct driven mower driving wheel comprises a driving wheel main body formed by the assembling of a wheel side cover I 11, a wheel side cover II 12, and a wheel body 2 sandwiched between the wheel side cover I 11 and the wheel side cover II 12, the wheel side cover II 12 and the wheel body 2 are of a one-piece structure formed in an integrative molding way, the wheel side cover I 11, the wheel side cover II 12 and the wheel body 2 are enclosed to define a cavity 3, an outer rotor motor 4 is mounted in the cavity 3, an outer rotor portion of the outer rotor motor 4 is fixedly arranged relative to the driving wheel main body, a stator portion of the outer rotor motor 4 is provided with a fixed member 41 penetrating through the wheel side cover I 11 and extending out of the driving wheel main body, the fixed member 41 is a tubular or hollow cannular structure, of which the hollow portion is used to bring out a connecting lead of the outer rotor motor 4, and the wheel side cover I 11 is provided with a shaft hole I 111 allowing the fixed member 41 to penetrate through. The outer edges of both the wheel side cover I 11 and the wheel side cover II 12 are provided with a plurality of convex tooth 13, and the convex tooth 13 on the wheel side cover I 11 and the convex tooth 13 on the wheel side cover II 12 are distributed in a staggered manner. The outer circumferential surface of the wheel body 2 is provided with a plurality of concave arc surfaces 21, a protrusion I 22 is formed at where two adjacent concave arc surfaces 21 are connected, the convex teeth 13 on the wheel side cover II 12 is arranged corresponding to the protrusion I 22 on the wheel body 2, and the outer edge of the wheel side cover I 11 located between two adjacent convex tooth 13 is provided with a protrusion II 114 arranged corresponding to the protrusion I 22 on the wheel body 2. The wheel body 2 comprises an outer ring 23, an inner ring 24 concentric with the outer ring 23, and a plurality of connection ribs 25 connected between the outer ring 23 and the inner ring 24, and the cavity 3 is enclosed by the inner ring 24 and two wheel side covers 1. The inner side wall of the inner ring 24 is provided with a plurality of convex ridge 26 which are uniformly distributed along the circumference of the inner side wall of the inner ring 24, the inner surface of the wheel side cover 12 located inside the scope enclosed by the inner ring 24 is provided with a supporting ridge 27 composed of an annular ridge and a linear ridge, and, after the outer rotor motor is mounted in the cavity 3, the outer rotor motor contacts the convex ridge 26 and the supporting ridge 27 such that certain clearance is reserved between the outer rotor motor and the inner ring 24, the wheel side cover 12 to facilitate heat dissipation. The side wall of the wheel side cover I 11 is provided with a ring body 112 extending into the inner ring 24, and the inner diameter of the ring body 112 is slightly less than the inner diameter of the inner ring 24. The side wall of the wheel side cover I 11 is provided with a plurality of reinforcing ribs 113 extending along the radial direction of the wheel side cover I 11. The outer rotor portion of the outer rotor motor 4 is connected with the wheel side cover II 12 through a bolt, the wheel side cover II 12 is provided with a plurality of threaded holes 14 allowing the bolt to pass through, and the outer side of the wheel side cover II 12 is mounted with a dust cap 5 for covering the threaded hole 14. The dust cap 5 and the wheel side cover II 12 are in buckling connection, the dust cap 5 is provided with a clamping hook 51 used for clamping connection with the wheel side cover II 12, correspondingly, the wheel side cover II 12 also has a clamping groove matched with the clamping hook 51. The dust cap 5 is a circular plate, one side of which facing the wheel side cover II 12 is provided with three arc convex ribs 52 enclosing a ring shape, and the arc convex rib 52 is pressed against the outer side wall of the wheel side cover II 12 such that certain clearance is reserved between the dust cap 5 and the wheel side cover II 12 to play a role of noise reduction.

Embodiment 2

Figure 6:
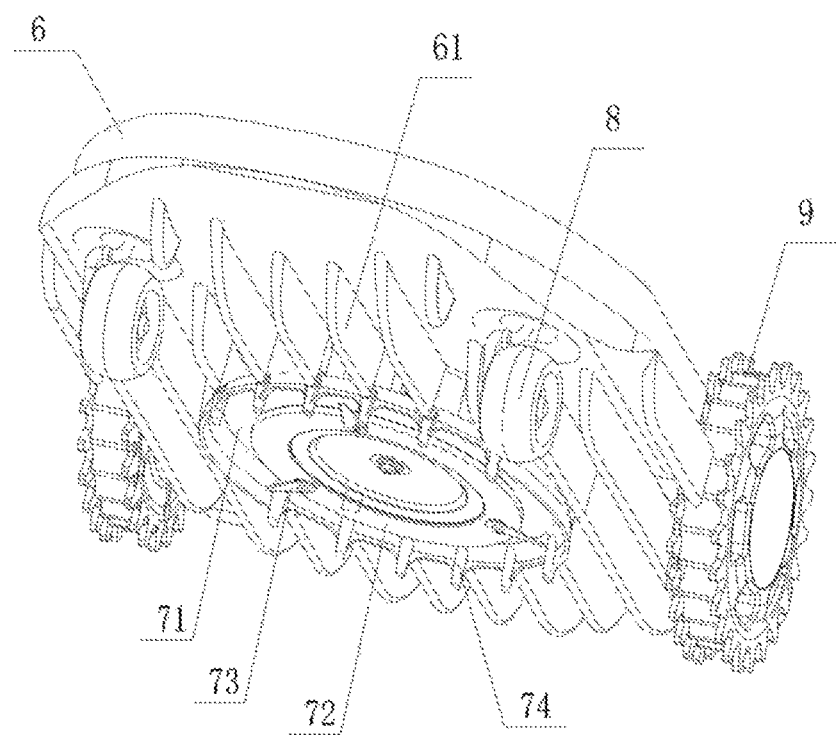
FIG. 6 is a structure diagram of an Embodiment 2 of the present invention.

As shown in FIG. 6, a mower comprises a machine body 6, two universal wheels 8 are mounted on the bottom front part of the machine body 6 and two driving wheels 9 are mounted on two rear sides thereof, wherein the driving wheel 9 is the embedded-outer rotor motor direct driven mower driving wheel described in the Embodiment 1, in which, the fixed member 41 is fixedly connected with the machine body 6, and the machine body 6 is provided with a control system in electrical connection with the outer rotor motor; a cutter head rack 71 is mounted in the middle of the machine body 6, a cutter head 72 is mounted on the cutter head rack 71, a blade 73 is mounted on the cutter head 72, a plurality of protection columns 74 is arranged on the cutter head rack 71, space is reserved between two adjacent protection columns 74, the cutter head 72 and the blade 73 are kept in the middle of the protection columns 74; the bottom surface of the machine body 6 located surrounding the cutter head rack 71 is provided with a plurality of long striped ribs 61, of which the extension direction is consistent with the walking direction of the mower; the purpose of arranging the ribs 61 and protection columns 74 is to prevent body parts such as arm and finger of an operator or a child stretching from the space between the bottom surface of the machine body 6 and the ground surface to the position where the cutter head 72 and the blade 73 are located to be cut by the blade 73 during the operating process of the mower, thereby eliminating safety hazard.

The invention claimed is:

1. An embedded-outer rotor motor direct driven mower driving wheel, characterized in that: the embedded-outer rotor motor direct driven mower driving wheel comprises a driving wheel main body formed by an assembling of a wheel side cover I (11), a wheel side cover II (12), and a wheel body (2) sandwiched between the wheel side cover I (11) and the wheel side cover II (12), the wheel side cover I (11), the wheel side cover II (12) and the wheel body (2) are enclosed to define a cavity (3), an outer rotor motor (4) is mounted in the cavity (3), an outer rotor portion of the outer rotor motor (4) is fixedly arranged relative to the driving wheel main body, a stator portion of the outer rotor motor (4) is provided with a fixed member (41) penetrating through the wheel side cover I (11) and extending out of the driving wheel main body, and the wheel side cover I (11) is provided with a shaft hole I (111) allowing the fixed member (41) to penetrate through, the outer edges of both the wheel side cover I (11) and the wheel side cover II (12) are provided with a plurality of convex tooth (13), and the convex tooth (13) on the wheel side cover I (11) and the convex tooth (13) on the wheel side cover II (12) are distributed in a staggered manner.

2. The embedded-outer rotor motor direct driven mower driving wheel according to claim 1, characterized in that: the outer circumferential surface of the wheel body (2) is provided with a plurality of concave arc surfaces (21), a protrusion I (22) is formed at where adjacent concave arc surfaces (21) are connected, the convex teeth (13) on the wheel side cover II (12) is arranged corresponding to the protrusion I (22) on the wheel body (2), and the outer edge of the wheel side cover I (11) located between two adjacent convex tooth (13) is provided with a protrusion II (114) arranged corresponding to the protrusion I (22) on the wheel body (2).

3. The embedded-outer rotor motor direct driven mower driving wheel according to claim 1, characterized in that: the outer circumferential surface of the wheel body (2) is provided with a plurality of concave arc surfaces (21), and a protrusion I (22) is formed at where adjacent concave arc surfaces (21) are connected.

4. The embedded-outer rotor motor direct driven mower driving wheel according to any one of claim 1, characterized in that: the wheel body (2) comprises an outer ring (23), an inner ring (24) concentric with the outer ring (23), and a plurality of connection ribs (25) connected between the outer ring (23) and the inner ring (24), and the cavity (3) is enclosed by the inner ring and two wheel side covers (1).

5. The embedded-outer rotor motor direct driven mower driving wheel according to claim 4, characterized in that: the side wall of the wheel side cover I (11) is provided with a ring body (112) extending into the inner ring (24), and the ring body (112) is in clearance fit with the inner ring (24).

6. The embedded-outer rotor motor direct driven mower driving wheel according to any one of claim 1, characterized in that: the side wall of the wheel side cover I (11) is provided with a plurality of reinforcing ribs (113) extending along the radial direction of the wheel side cover I (11).

7. The embedded-outer rotor motor direct driven mower driving wheel according to any one of claim 1, characterized in that: the outer rotor portion of the outer rotor motor (4) is connected with the wheel side cover II (12) through a bolt, the wheel side cover II (12) is provided with a plurality of threaded holes (14) allowing the bolt to pass through, and the outer side of the wheel side cover II (12) is mounted with a dust cap (5) for covering the threaded hole (14).

8. A mower, comprising a machine body (6) and a driving wheel (9) mounted on the machine body (6), characterized in that: the driving wheel (9) comprising a driving wheel main body formed by an assembling of a wheel side cover I (11), a wheel side cover II (12), and a wheel body (2) sandwiched between the wheel side cover I (11) and the wheel side cover II (12), the wheel side cover I (11), the wheel side cover II (12) and the wheel body (2) are enclosed to define a cavity (3), an outer rotor motor (4) is mounted in the cavity (3), an outer rotor portion of the outer rotor motor (4) is fixedly arranged relative to the driving wheel main body, a stator portion of the outer rotor motor (4) is provided with a fixed member (41) penetrating through the wheel side cover I (11) and extending out of the driving wheel main body, and the wheel side cover I (11) is provided with a shaft hole I (111) allowing the fixed member (41) to penetrate through, the outer edges of both the wheel side cover I (11) and the wheel side cover II (12) are provided with a plurality of convex tooth (13), and the convex tooth (13) on the wheel side cover I (11) and the convex tooth (13) on the wheel side cover II (12) are distributed in a staggered manner.

9. The mower according to claim 8, characterized in that: the outer circumferential surface of the wheel body (2) is provided with a plurality of concave arc surfaces (21), a protrusion I (22) is formed at where adjacent concave arc surfaces (21) are connected, the convex teeth (13) on the wheel side cover II (12) is arranged corresponding to the protrusion I (22) on the wheel body (2), and the outer edge of the wheel side cover I (11) located between two adjacent convex tooth (13) is provided with a protrusion II (114) arranged corresponding to the protrusion I (22) on the wheel body (2).

10. The mower according to claim 8, characterized in that: the outer circumferential surface of the wheel body (2) is provided with a plurality of concave arc surfaces (21), and a protrusion I (22) is formed at where adjacent concave arc surfaces (21) are connected.

11. The mower according to claim 8, characterized in that: the wheel body (2) comprises an outer ring (23), an inner ring (24) concentric with the outer ring (23), and a plurality of connection ribs (25) connected between the outer ring (23) and the inner ring (24), and the cavity (3) is enclosed by the inner ring and two wheel side covers (1).

12. The mower according to claim 11, characterized in that: the side wall of the wheel side cover I (11) is provided with a ring body (112) extending into the inner ring (24), and the ring body (112) is in clearance fit with the inner ring (24).

13. The mower according to claim 8, characterized in that: the side wall of the wheel side cover I (11) is provided with a plurality of reinforcing ribs (113) extending along the radial direction of the wheel side cover I (11).

14. The mower according to claim 8, characterized in that: the outer rotor portion of the outer rotor motor (4) is connected with the wheel side cover II (12) through a bolt, the wheel side cover II (12) is provided with a plurality of threaded holes (14) allowing the bolt to pass through, and the outer side of the wheel side cover II (12) is mounted with a dust cap (5) for covering the threaded hole (14).

* * * * *